United States Patent
Jeon et al.

(10) Patent No.: US 11,112,851 B2
(45) Date of Patent: *Sep. 7, 2021

(54) APPARATUS FOR DRIVING A TOUCH PAD AND A PORTABLE TERMINAL HAVING THE SAME

(71) Applicant: Samsung Electronics Co., Ltd., Suwon-si (KR)

(72) Inventors: Jae-Hyoung Jeon, Gumi-si (KR); Hark-Sang Kim, Daegu (KR); Seok-Hyo Park, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,237

(22) Filed: Jan. 21, 2020

(65) Prior Publication Data

US 2020/0159309 A1 May 21, 2020

Related U.S. Application Data

(63) Continuation of application No. 16/423,886, filed on May 28, 2019, now Pat. No. 10,579,127, which is a (Continued)

(30) Foreign Application Priority Data

Jul. 10, 2006 (KR) .................. 10-2006-0064420
May 23, 2007 (KR) .................. 10-2007-0050330

(51) Int. Cl.
*G06F 1/3234* (2019.01)
*G06F 3/0354* (2013.01)
(Continued)

(52) U.S. Cl.
CPC .......... *G06F 1/3262* (2013.01); *G06F 1/3203* (2013.01); *G06F 1/3287* (2013.01); (Continued)

(58) Field of Classification Search
CPC .... G06F 1/3203; G06F 1/3262; G06F 1/3287; G06F 3/03547; Y02D 10/00; Y02D 10/171; Y02D 30/50; Y02D 50/20
See application file for complete search history.

(56) References Cited

U.S. PATENT DOCUMENTS 5,062,034 A 10/1991 Bakker
5,543,588 A 8/1996 Bisset et al.
(Continued)

FOREIGN PATENT DOCUMENTS

JP 2740171 B2 1/1998
JP 3280870 B2 5/2002
(Continued)

OTHER PUBLICATIONS

Glint Basinger, HP iPAQ RX1955—The 2005 Windows Pocket PC Experience, Lazy Game Reviews (LGR), YouTube, May 11, 2018, https://www.youtube.com/watch?v=wm5omDCENPo.

*Primary Examiner* — Afroza Chowdhury
(74) *Attorney, Agent, or Firm* — Jefferson IP Law, LLP (57) ABSTRACT

An apparatus for driving a touchpad of a portable terminal including a second control unit controlling the touchpad in an active mode is provided. The apparatus includes a sensor unit for generating interrupt signals when pressure on the touchpad is sensed, a first control unit for outputting activating signals to activate the second control unit when the interrupt signals are input and a switching unit for transmitting the interrupt signals generated from the sensor unit to the first control unit when the second control unit is in an inactive mode. Accordingly, even though the multimedia (Continued)

processor embedded in the portable terminal is in an inactive mode, the multimedia processor is activated when a user presses the touchpad, thereby making it possible to process signals input by touching the touchpad, particularly, to keep the user interface. Furthermore, the multimedia processor embedded in the portable terminal can reduce the consumption of battery power required to maintain the user interface, as compared with multimedia processors maintaining operating in a conventional polling method.

33 Claims, 7 Drawing Sheets

Related U.S. Application Data continuation of application No. 16/132,034, filed on Sep. 14, 2018, now Pat. No. 10,338,667, which is a continuation of application No. 11/764,963, filed on Jun. 19, 2007, now Pat. No. 10,133,339.

(51) Int. Cl.
*G06F 1/3287* (2019.01)
*G06F 1/3203* (2019.01)

(52) U.S. Cl.
CPC .......... *G06F 3/03547* (2013.01); *Y02D 10/00* (2018.01); *Y02D 30/50* (2020.08)

(56) References Cited

U.S. PATENT DOCUMENTS

| | | | |
|---|---|---|---|
| 5,734,373 A | 3/1998 | Rosenberg et al. |
| 5,995,084 A | 11/1999 | Chan et al. |
| 6,034,672 A | 3/2000 | Gaultier et al. |
| 6,050,490 A | 4/2000 | Leichner et al. |
| 6,091,031 A | 7/2000 | Lee et al. |
| 6,097,401 A | 8/2000 | Owen et al. |
| 6,356,963 B1 | 5/2002 | Maguire et al. |
| 6,429,846 B2 | 8/2002 | Rosenberg et al. |
| 6,680,729 B1 | 1/2004 | Shahoian et al. |
| 6,715,078 B1 | 3/2004 | Chasko et al. |
| 6,738,514 B1 | 5/2004 | Shin et al. |
| 7,002,553 B2 | 2/2006 | Shkolnikov |
| 7,167,162 B2 | 1/2007 | Gordon |
| 7,200,781 B2 | 4/2007 | Mantey et al. |
| 7,222,206 B2 | 5/2007 | Kee et al. |
| 7,423,635 B2 | 9/2008 | Taylor et al. |
| 7,472,267 B2 | 12/2008 | Park et al. |
| 7,499,040 B2 | 3/2009 | Zadesky et al. |
| 7,602,384 B2 | 10/2009 | Rosenberg et al. |
| 7,606,552 B2 | 10/2009 | Orr et al. |
| 7,659,887 B2 | 2/2010 | Larsen et al. |
| 8,049,716 B2 | 11/2011 | Oh et al. |
| 8,295,453 B2 | 10/2012 | Wang |
| 10,133,339 B2 * | 11/2018 | Jeon .................... G06F 3/03547 |
| 10,338,667 B2 * | 7/2019 | Jeon .................... G06F 3/03547 |
| 10,579,127 B2 * | 3/2020 | Jeon .................... G06F 1/3262 |
| 2002/0173344 A1 | 11/2002 | Cupps et al. |
| 2002/0180704 A1 | 12/2002 | Rudd |
| 2003/0025689 A1 | 2/2003 | Kim |
| 2003/0107557 A1 | 6/2003 | Liebenow et al. |
| 2003/0122779 A1 | 7/2003 | Martin et al. |
| 2003/0198008 A1 | 10/2003 | Leapman et al. |
| 2003/0229900 A1 | 12/2003 | Reisman |
| 2004/0090423 A1 | 5/2004 | Bisset |
| 2004/0125087 A1 | 7/2004 | Taylor et al. |
| 2004/0207605 A1 | 10/2004 | MacKey et al. |
| 2004/0230878 A1 | 11/2004 | Mantey |
| 2005/0017947 A1 | 1/2005 | Shahoian et al. |
| 2005/0052425 A1 | 3/2005 | Zadesky et al. |
| 2005/0057489 A1 | 3/2005 | Kung et al. |
| 2005/0066209 A1 | 3/2005 | Kee et al. |
| 2005/0128182 A1 | 6/2005 | Gordon |
| 2005/0280639 A1 | 12/2005 | Taylor et al. |
| 2006/0002203 A1 | 1/2006 | Kondo et al. |
| 2006/0119585 A1 | 6/2006 | Skinner |
| 2006/0192771 A1 | 8/2006 | Rosenberg et al. |
| 2006/0250377 A1 | 11/2006 | Zadesky et al. |
| 2007/0102525 A1 | 5/2007 | Orr et al. |
| 2007/0152982 A1 | 7/2007 | Kim et al. |
| 2007/0182719 A1 | 8/2007 | Lee et al. |
| 2008/0007536 A1 | 1/2008 | Jeon et al. |
| 2008/0115078 A1 | 5/2008 | Girgaonkar |
| 2008/0134010 A1 | 6/2008 | Roselli et al. |
| 2010/0141606 A1 | 6/2010 | Bae et al. |
| 2010/0315330 A1 | 12/2010 | Rhim et al. |

FOREIGN PATENT DOCUMENTS

| | | |
|---|---|---|
| KR | 10-2002-0088116 A | 11/2002 |
| KR | 10-2004-0028425 A | 4/2004 |
| KR | 10-2005-0105033 A | 11/2005 |
| KR | 10-2007-0024165 A | 3/2007 |
| KR | 10-2007-0032176 A | 3/2007 |
| WO | 2003/096669 A2 | 11/2003 |

* cited by examiner

APPARATUS FOR DRIVING A TOUCH PAD AND A PORTABLE TERMINAL HAVING THE SAME

PRIORITY

This application is a continuation application of prior application Ser. No. 16/423,886, filed on May 28, 2019; which is a continuation application of prior application Ser. No. 16/132,034, filed on Sep. 14, 2018, which has issued as U.S. Pat. No. 10,338,667 on Jul. 2, 2019, which is a continuation application of prior application Ser. No. 11/764,963, filed on Jun. 19, 2007, which has issued as U.S. Pat. No. 10,133,339 on Nov. 20, 2018; and which claimed priority under 35 U.S.C. 119(a) of a Korean patent application 10-2006-064420, filed on Jul. 10, 2016, and of a Korean patent application 10-2007-050330, filed on May 23, 2007, the entire disclosures of each of which are hereby incorporated by reference.

BACKGROUND OF THE INVENTION

1. Field of the Invention

The present invention relates to an apparatus for driving a touchpad of a portable terminal. More particularly, the present invention relates to an apparatus for driving a touchpad of a portable terminal, which includes the touchpad and a multimedia processor controlling the touchpad.

2. Description of the Related Art

Portable communication terminals have been widely used for some time. Most recently, portable terminals have tended to be multimedia devices which have the ability to perform various advanced functions. Specifically, portable terminals combined with a Portable Multimedia Player (PMP) and portable terminals which can provide a multimedia function, have been rapidly developed. These portable terminals have a multimedia processor embedded therein, which can perform a multimedia function.

Portable terminals providing a multimedia function may have a touchpad that can sense input signals exerted thereon by the user's fingers, pens, and the like. The touchpad provides an efficient user interface and a more convenient method of using the multimedia functions.

However, in these portable terminals having a touchpad, the embedded multimedia processor controls the touchpad with a polling method. Accordingly, battery power is unnecessarily consumed in order to keep the user interface with the touchpad active.

Furthermore, when the multimedia processor enters or is converted to a sleep mode, it cannot recognize input signals from the touchpad even though the user presses the touchpad. Hence, there is a problem in that the user interface cannot be maintained with the touchpad.

SUMMARY OF THE INVENTION

An aspect of the present invention is to address at least the above-mentioned problems and/or disadvantages occurring in the prior art and to provide at least the advantages described below. Accordingly, it is an object of the present invention to provide an apparatus for driving a touchpad of a portable terminal, which can maintain a user interface efficiently.

It is another object of the present invention to provide an apparatus for driving a touchpad of a portable terminal, which can reduce consumption of electric power required to maintain a user interface.

In accordance with an aspect of the present invention, an apparatus for driving a touchpad of a portable terminal is provided. The apparatus includes a sensor unit for generating interrupt signals when pressure on the touchpad is sensed, a second control unit for controlling the touchpad in an active mode, a first control unit for outputting activating signals to activate the second control unit when the interrupt signals are input and a switching unit for transmitting the interrupt signals generated from the sensor unit to the first control unit when the second control unit is in an inactive mode.

In accordance with another aspect of the present invention, an apparatus for driving a touchpad of a portable terminal is provided The apparatus includes a sensor unit for generating interrupt signals when pressure on the touchpad is sensed a second control unit for controlling the touchpad in an active mode, and a first control unit for outputting activating signals to activate the second control unit when the interrupt signals are input.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
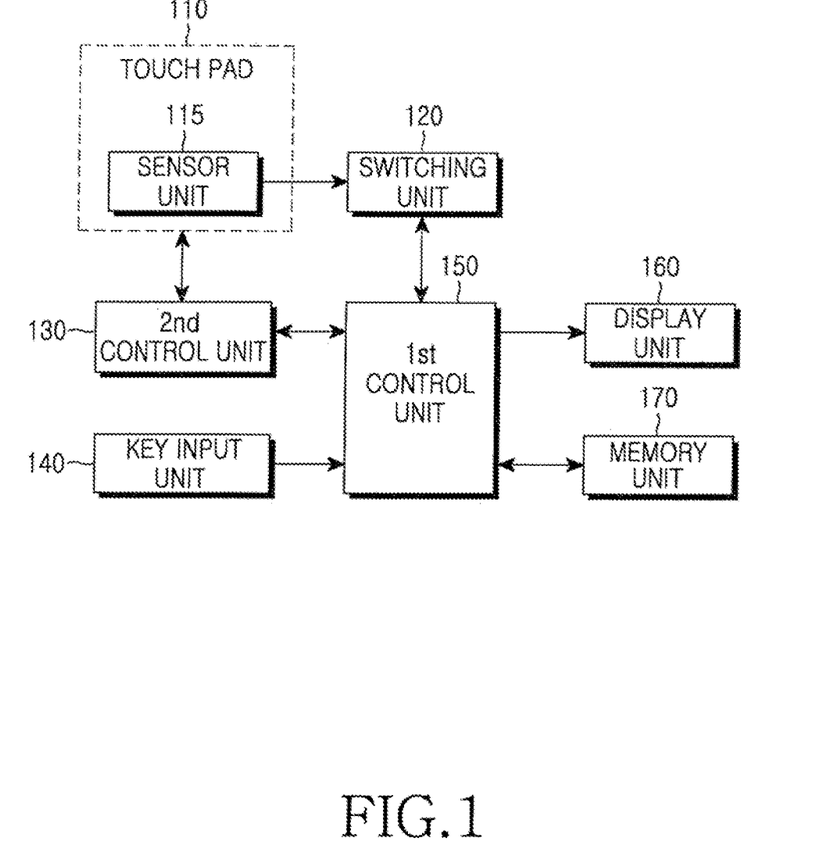
FIG. 1 is a block diagram illustrating a portable terminal according to an exemplary embodiment of the present invention.
Figure 2:
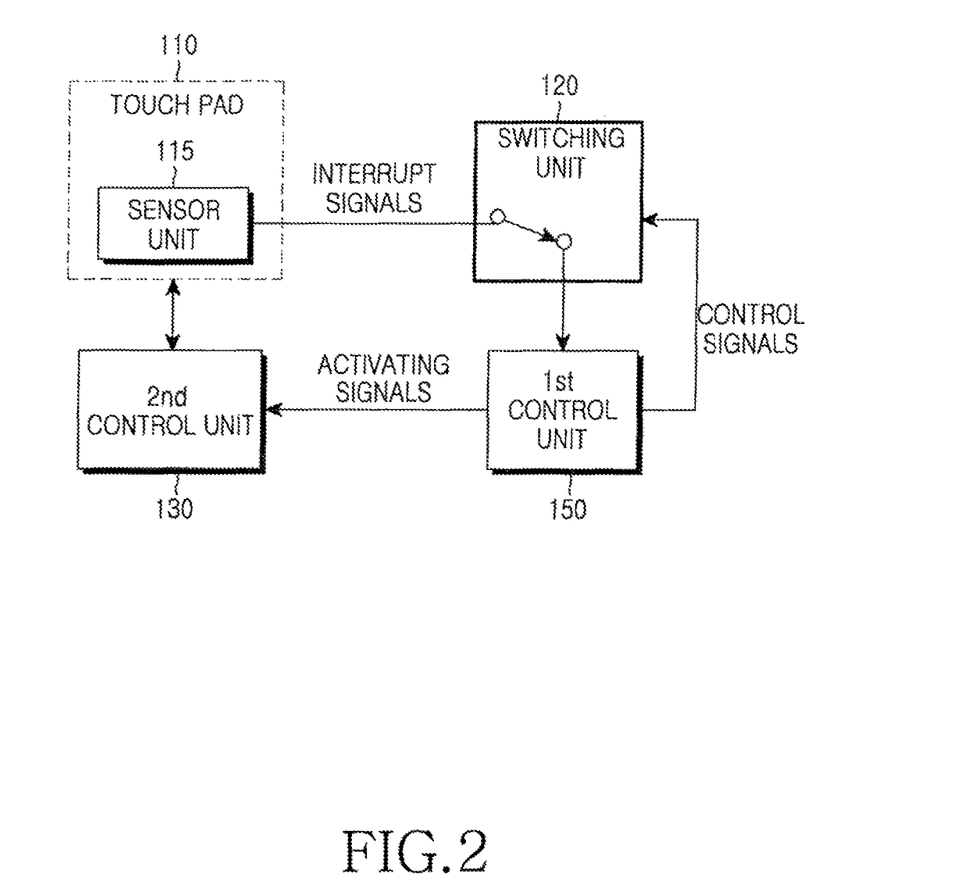
FIG. 2 is a block diagram illustrating a detailed structure of the exemplary portable terminal shown in FIG. 1.

FIG. 1 is a block diagram illustrating a portable terminal according to an exemplary embodiment of the present invention, and FIG. 2 is a block diagram illustrating a detailed structure of the exemplary portable terminal shown in FIG. 1.

The portable terminal shown in FIG. 1 includes a touchpad 110, a sensor unit 115, a switching unit 120, a second control unit 130, a key input unit 140, a first control unit 150, a display unit 160, and a memory unit 170.

Referring to FIGS. 1 and 2, the touchpad 110 includes a small flat panel to which a pressure sensor is attached. In operation of the touchpad 110, signals are input to the second control unit 130 when a user touches the touchpad 110 with a finger, a pen and the like.

The sensor unit 115 generates interrupt signals and outputs them to the switching unit 120 upon sensing pressure on the touchpad 110. The sensor unit may be included in the touchpad 110.

In an exemplary embodiment of the present invention, the sensor unit 115 includes a dome sheet 112 having a dome switch. The dome switch senses pressure on a window of the touchpad 110 so as to output interrupt signals to the switching unit 120.

Figure 3:
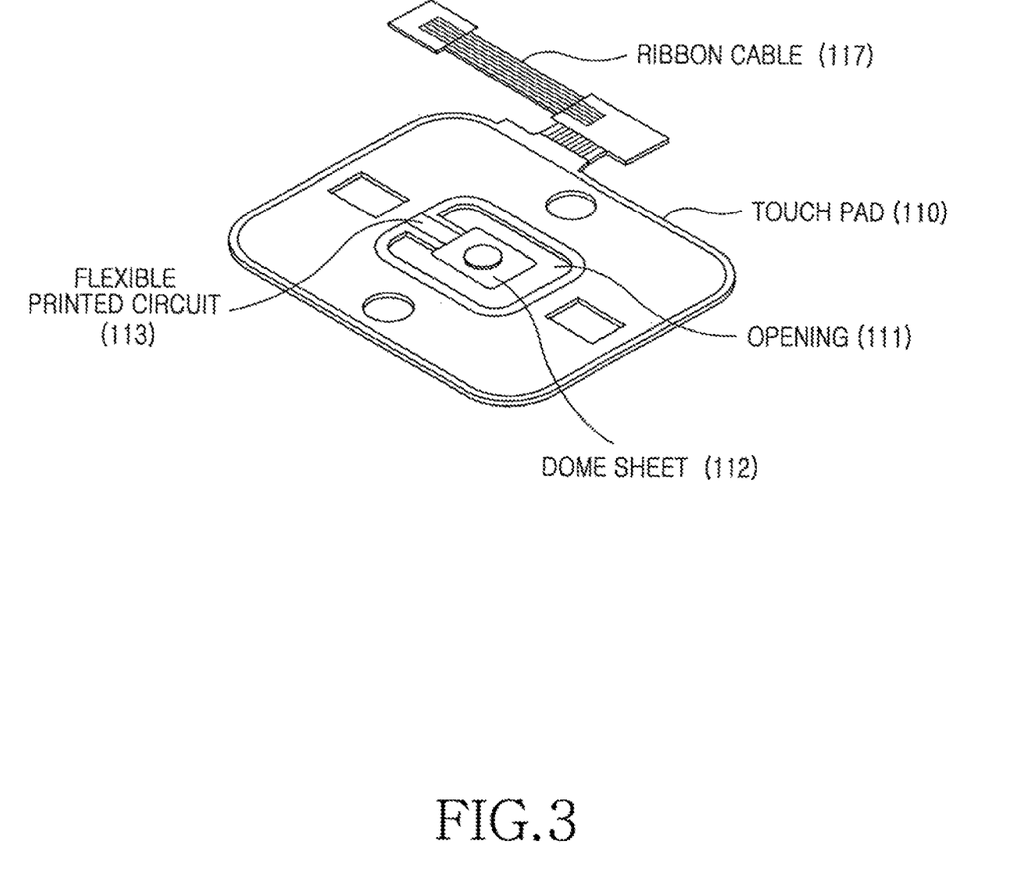
FIG. 3 is a perspective view illustrating a structure of a touchpad of a portable terminal according to an exemplary embodiment of the present invention.

With reference to FIG. 3, an exemplary structure, having the dome sheet included in the touchpad 110, will be described hereinafter.

FIG. 3 is a perspective view illustrating a structure of a touchpad of a portable terminal according to an exemplary embodiment of the present invention.

Referring to FIG. 3, the touchpad 110 is connected to a circuit board (not shown) of the portable terminal through a ribbon cable 117.

The touchpad 110 has an opening 111 formed in a part thereof, and a dome sheet 112 including a dome switch is disposed in the opening 111.

The dome sheet 112 is connected to the touchpad 110 through a flexible printed circuit 113, and the opening 111 is formed in the touchpad 110. In an exemplary embodiment, the opening 111 is formed at the center of the touchpad 110. Therefore, the dome switch outputs interrupt signals when a window, which is positioned in the touchpad 110, is pressured so as to close a switch.

Referring to FIGS. 1 and 2, the second control unit 130 controls the touchpad 110 in the active state, and maintains an interface between a user and the portable terminal through the touchpad 110.

When the second control unit 130 enters an inactive mode, the switching unit 120, under the control of the first control unit 150, connects an interrupt signal line output from the sensor unit 115 to the first control unit 150. Therefore, the switching unit 120 can transmit an interrupt signal generated in the sensor unit 115 to the first control unit 150 through the interrupt signal line.

On the other hand, when the second control unit 130 is in an active mode, the switching unit 120, under the control of the first control unit 150, disconnects the interrupt signal line so that the interrupt signals are not transmitted to the first control unit 150.

More specifically, if the second control unit 130 enters an inactive mode, for example a sleep mode, the second control unit 130 may notify the first control unit. The first control unit 150 then generates a control signal and enables the switching unit 120 to transmit interrupt signals output from the sensor unit 115 to the first control unit 150. At this time, the first control unit 150 can be converted to the sleep mode after controlling the switching unit 120.

When the second control unit 130 is in an inactive mode, if an interrupt signal is generated from the sensor unit 115 and input to the first control unit 150, the first control unit 150 outputs an activating signal to the second control unit 130 so as to activate the second control unit 130. Then, the second control unit 130 is converted from the inactive mode to the active mode to process signals input through the touchpad 110.

On the other hand, if an interrupt signal is input into the first control unit 150 while it is in the sleep mode, the first control unit 150 is converted to the active mode. Then, the first control unit 150 outputs an activating signal to the second control unit 130 to activate the second control unit 130, and in turn is converted to the sleep mode again.

The switching unit 120 may be implemented as an analog switch in an exemplary embodiment of the present invention.

In an exemplary embodiment of the present invention, the second control unit 130 includes a multimedia processor for performing a multimedia function of the portable terminal. The multimedia function refers to a function of processing various media including voices, figures, pictures, etc.

The key input unit 140 includes character keys, numeric keys, various function keys, and external volume control buttons, and outputs key input signals corresponding to the user's key input to the control unit 150.

The first control unit 150 (e.g., a Mobile Station Modem (MSM) chip) controls overall operations of the portable terminal according to an exemplary embodiment of the present invention.

The display unit 160 may include a Liquid Crystal Display (LCD), etc., and outputs various display data generated by the portable terminal.

The memory unit 170 may include program memories and data memories, and stores a wide variety of information required to control the operation of the portable terminal according to an exemplary embodiment of the present invention. The memory unit 170 may also store various selected information based on user selection information. For example, the memory unit 170 may include a ROM for storing an operation algorithm accessed by the first control unit 150 for the overall operation of the portable terminal, and a RAM for storing data depending on control instruction in a procedure for processing data of the first control unit 150.

Figure 4:
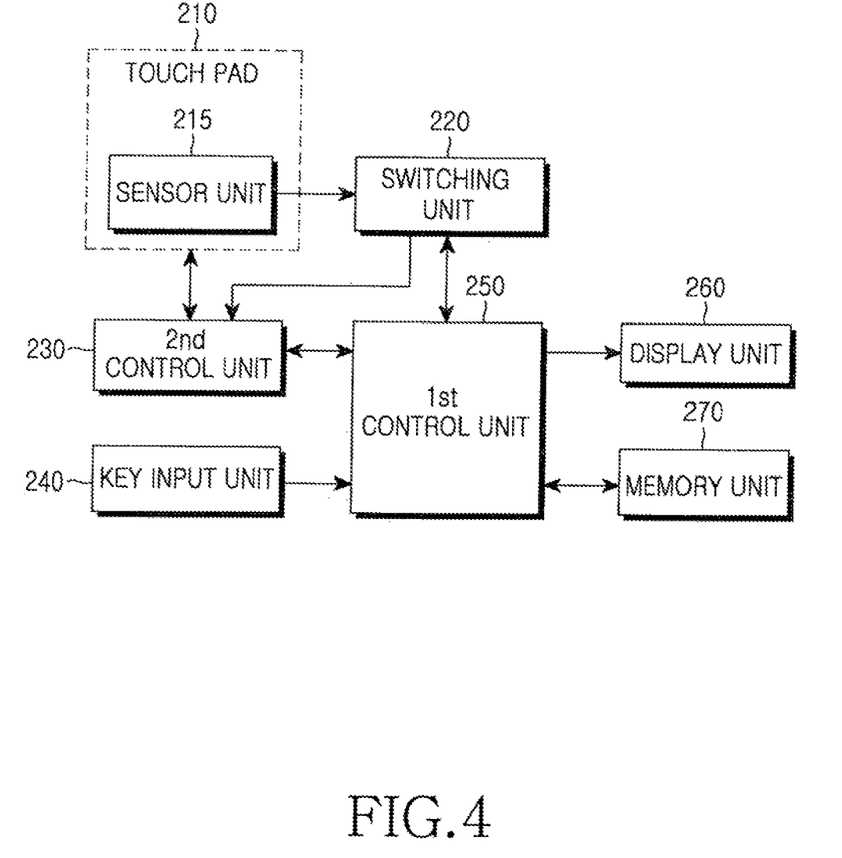
FIG. 4 is a block diagram illustrating a portable terminal according to an exemplary embodiment of the present invention.
Figure 5:
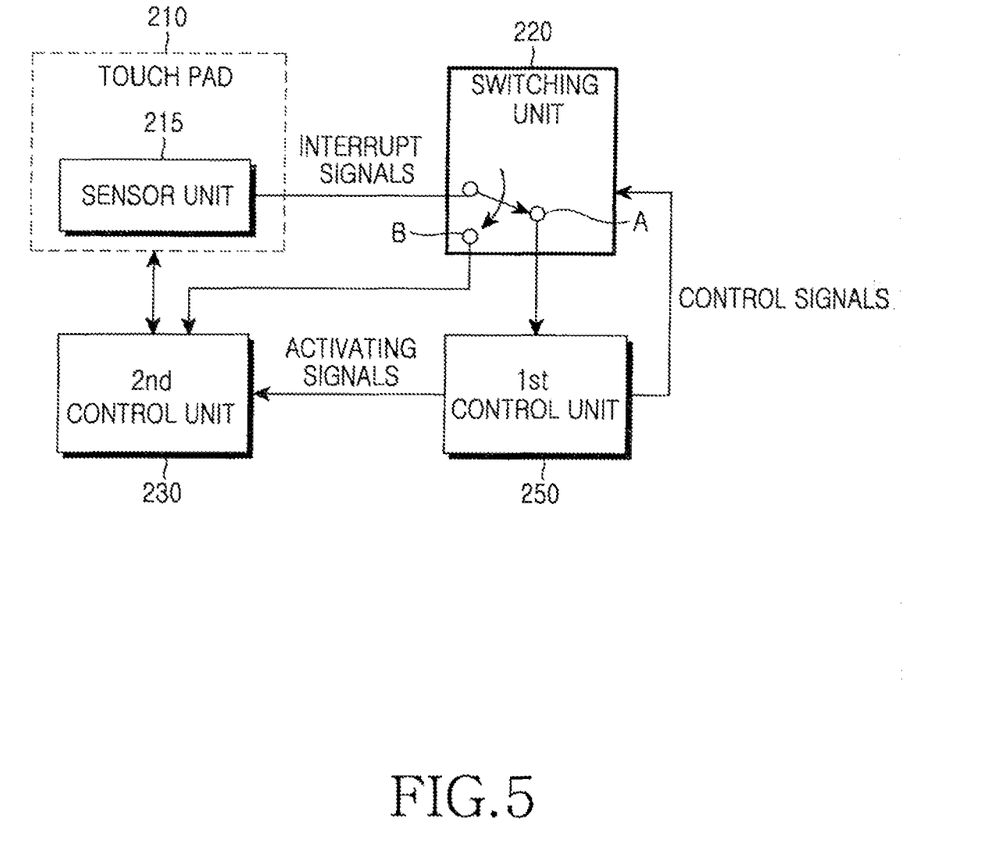
FIG. 5 is a block diagram illustrating a detailed structure of the exemplary portable terminal shown in FIG. 4.

FIG. 4 is a block diagram illustrating a portable terminal according to an exemplary embodiment of the present invention, and FIG. 5 is a block diagram illustrating a detailed structure of the portable terminal shown in FIG. 4.

As illustrated, the portable terminal includes a touchpad 210, a sensor unit 215, a switching unit 220, a second control unit 230, a key input unit 240, a first control unit 250, a display unit 260, and a memory unit 270.

In the structure of FIG. 4, functions of the key input unit 230, the display unit 260, and a memory unit 270 are substantially the same as functions of the key input unit 140, the display unit 160, and the memory unit 170 of FIG. 1, respectively, according to the previous exemplary embodiment of the present invention. Therefore, description of these functions will be omitted for clarity.

Referring to FIGS. 4 and 5, the touchpad 210 includes a small flat panel to which a pressure sensor is attached. Signals are input to the second control unit 230 when the user touches the touchpad 210 with a finger, a pen and the like.

The sensor unit 215 generates an interrupt signal and outputs it to the first control unit 240 upon sensing pressure on the touchpad 210. The sensor unit 215 may be embedded or included in the touchpad 210

In an exemplary embodiment of the present invention, the sensor unit 215 includes a dome sheet having a dome switch, which is substantially the same as the previous exemplary embodiment of the present invention. The dome switch senses pressure on a window of the touchpad 210 so as to output interrupt signals to the first control unit 250. Meanwhile, a structure of the touchpad 210 including the sensor unit 215 has been already described above in FIG. 3. Therefore, description about this structure will be omitted.

The switching unit 220 includes an analog switch according to an exemplary embodiment of the present invention. When the second control unit 230 enters an inactivate mode, the switching unit 220, under the control of the first control unit 250, connects an interrupt signal line output from the sensor unit 215 to the first control unit 250. For example, referring to FIG. 5, the switching unit 220 is in a state A, so as to transmit interrupt signals generated in the sensor unit 215 to the first control unit 250 through an interrupt signal line.

Furthermore, when the second control unit 230 is in an active mode, the switching unit 220 connects an interrupt signal line to the second control unit 230 under the control of the first control unit 250. For example, the switching unit 220 is in a state 13 with reference to FIG. 5 so as to transmit interrupt signals generated in the sensor unit 215 to the second control unit 230 through an interrupt signal line. From this point, the touchpad 210 is under the control of the second control unit 230.

In an exemplary embodiment of the present invention, the second control unit 230 may include a multimedia processor for processing multimedia including voices, pictures, and the like, similar to the above description with reference to FIG. 1. When the second control unit 230 is in an active state, i.e. an activate mode, the touchpad 210 is controlled by the second control unit 230 to maintain a user interface.

Furthermore, when the second control unit 230 is converted from the active mode to the inactive mode, the second control unit 230 outputs a signal for notifying conversion to the inactive mode to the first control unit 250. As a result, the first control unit 250 connects an interrupt signal line of the switching unit 220 connected with the second control unit 230 to the first control unit 250.

The first control unit 250 controls overall operations of the portable terminal according to an exemplary embodiment of the present invention.

When an interrupt signal is input to the first control unit 250 from the sensor unit 215 in a state that the second control unit 230 is in an inactive mode, the first control unit 250 outputs activate signals so as to activate the second control unit 230. The first control unit 250 also generates a control signal so as to cause the switching unit 220 to transmit interrupt signals to the second control unit 230. Then, the second control unit 230 is converted from the inactive mode to an active mode so as to process signals input through the touchpad 210.

When interrupt signals are input to the first control unit 250 while it is in the sleep mode, the first control unit 250 is converted to the active mode. Then, the first control unit 250 outputs activating signals and is converted to the sleep mode again.

The first control unit 250 determines if the second control unit 230 is in the active mode at a certain time period so as to cause the switching unit 220 to transmit the interrupt signal line.

When the second control unit 230 is not in the active mode as a result of the determining, the first control unit 250 causes the switching unit 220 to transmit interrupt signals generated in the sensor unit 215 to the first control unit 250.

According to another exemplary embodiment, when signals for notifying conversion to the inactive mode are input from the second control unit 230 to the first control unit 250, under the control of the control unit 250, the switching unit 220 can also transmit interrupt signals generated in the sensor unit 215 to the first control unit 250.

Figure 6:
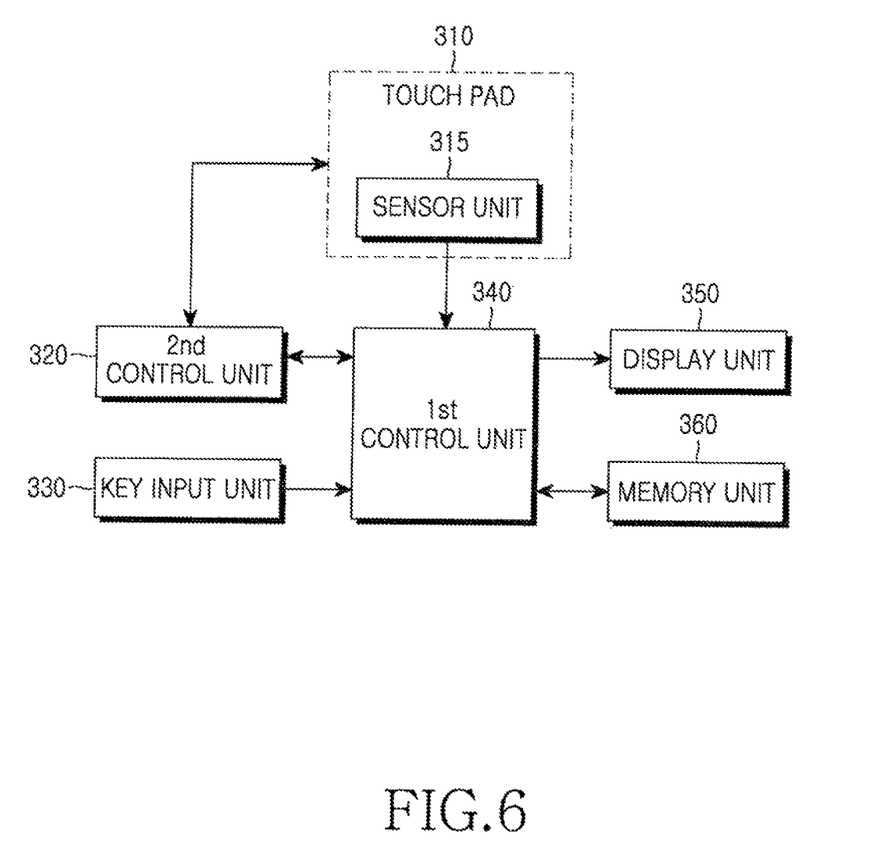
FIG. 6 is a block diagram illustrating a portable terminal according to another exemplary embodiment of the present invention.
Figure 7:
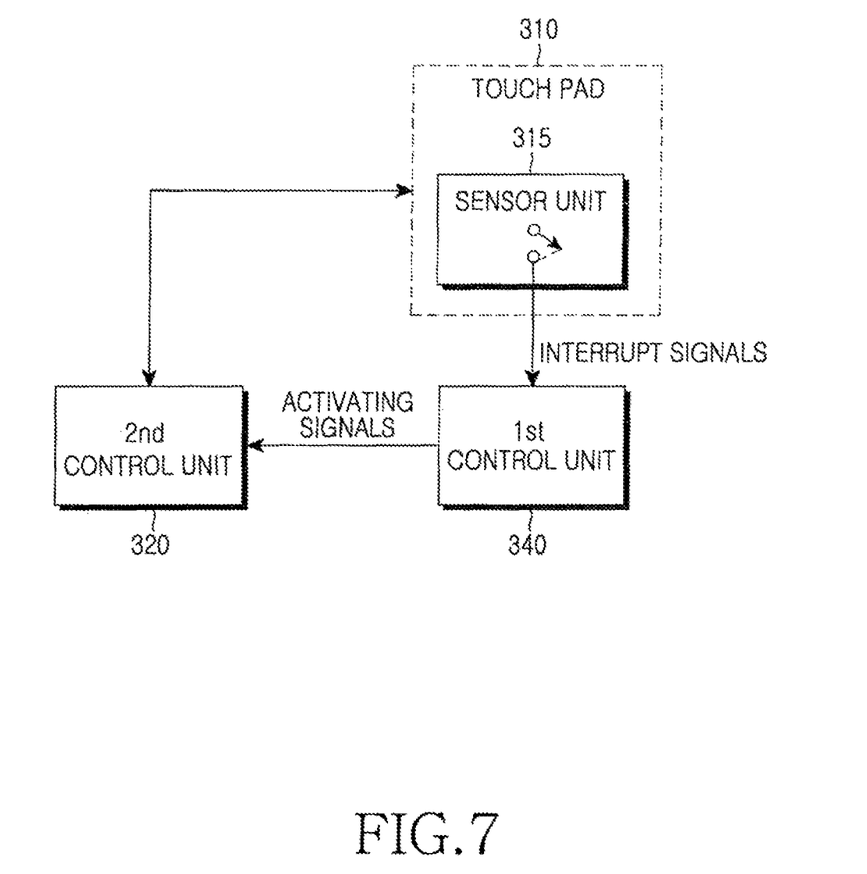
FIG. 7 is a block diagram illustrating a detailed structure of the exemplary portable terminal shown in FIG. 6.

FIG. 6 is a block diagram illustrating a portable terminal according to another exemplary embodiment of the present invention, and FIG. 7 is a block diagram illustrating a detailed structure of the portable terminal shown in FIG. 6.

As illustrated, the portable terminal includes a touchpad 310, a sensor unit 315, a second control unit 320, a key input unit 330, a first control unit 340, a display unit 350, and a memory unit 360.

In the structure of FIG. 6, functions of the key input unit 330, the display unit 350, and a memory unit 360 are substantially the same as functions of the key input unit 140, the display unit 160, and the memory unit 170 of FIG. 1, respectively, according to the previous exemplary embodiment of the present invention. Therefore, description of these functions will be omitted.

Referring to FIGS. 6 and 7, the touchpad 310 includes a small flat panel to which a pressure sensor is attached. Signals are input to the second control unit 320 when the user touches the touchpad 310 with a finger, a pen and the like.

The sensor unit 315 generates interrupt signals and outputs them to the first control unit 340 upon sensing pressure on the touchpad 310. The sensor unit 315 may be embedded or included in the touchpad 310.

In an exemplary embodiment of the present invention, the sensor unit 315 includes a dome sheet having a dome switch, which is substantially the same as the previous exemplary embodiments of the present invention. The dome switch senses pressure on a window of the touchpad 310 so as to output interrupt signals to the first control unit 340. Meanwhile, a structure of the touchpad 310 including the sensor unit 315 has been already described above in FIG. 3. Therefore description about this structure will be omitted for clarity.

Under the control of the second control unit 320 in an active state, i.e. an activate mode, the touchpad 310 is controlled to maintain a user interface.

In an exemplary embodiment of the present invention, the second control unit 320 may also include a multimedia processor for processing multimedia including voices and pictures, similar to the above description with reference to FIG. 1. The first control unit 340 can be implemented as, for example, a Mobile Station Modem (MSM) chip and controls overall operations of the portable terminal according to an exemplary embodiment of the present invention.

When interrupt signals are input from the sensor unit 315 to the first control unit 340 in a state that the second control unit 320 is in the inactive mode, the first control unit 340 outputs an activating signal so as to activate the second control unit 320 which is in the inactive mode. Then, the second control unit 320 is converted from the inactive mode to the active mode to process signals input through the touchpad 310.

If the interrupt signals are input to the first control unit 340 while it is in the sleep mode, the first control unit 340 is converted to the active mode. Then, the first control unit 340 outputs an activating signal so as to activate the second control unit 320, and is converted to the sleep mode again.

When the first control unit 340, in the sleep mode or in the active mode, receives an interrupt signal from the sensor unit 315, it may identify if the second control unit 320 is in an active mode or a sleep mode. By identifying the state of the second control unit 320, it may prevent output of unnecessary activating signals by determining that the activating signals need not be output.

For example, when an interrupt signal is input to the first control unit 340 in a state that the second control unit 320 is in the activate mode as a result of the identification, the first control unit 340 does not output an activating signal. On the other hand, when the interrupt signals are input to the first control unit 340 in a state that the second control unit 320 is in the inactivate mode, the first control unit 340 outputs an activating signal.

As described above, even though the multimedia processor embedded in the portable terminal is in an inactive mode, the multimedia processor is immediately activated when the user presses the touchpad, thereby processing signals input by pressing the touchpad, thus, maintaining the user interface.

Furthermore, exemplary embodiments of the present invention can reduce the amount of battery power consumed by the multimedia processor embedded in the portable terminal in order to maintain the user interface, as compared with multimedia processors maintaining operation using a conventional polling method.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device comprising:
a touch input detection component;
a first processor; and
a second processor electrically coupled with the first processor,
wherein the first processor is configured to:
based on a signal for activating the first processor generated in response to a user input applied to the touch input detection component while the first processor is inactive, switch the first processor from being inactive consuming lower power to being active to perform operations of the electronic device, and
output a first signal to the second processor, the first signal being for activating the second processor,
wherein the second processor is configured to:
based on the first signal input to the second processor while the first processor is active, switch the second processor to be active to receive a touch input signal, and
based on receiving a touch input signal while the first processor and the second processor are active, output a second signal to the first processor, and
wherein the first processor is further configured to, based on receiving the second signal from the second processor, perform an operation of the electronic device.

2. The electronic device of claim 1, wherein the touch input detection component comprises a touch screen display.

3. The electronic device of claim 1,
wherein the first processor is further configured to consume power at a lower rate of power consumption while being inactive than while being active, and
wherein the second processor is further configured to consume power at a lower rate of power consumption while being inactive than while being active.

4. The electronic device of claim 3, wherein the touch input detection component comprises a touch screen display.

5. The electronic device of claim 1, wherein the first processor is inactive while the first processor is in a sleep state, and the second processor is inactive while the second processor is in the sleep state.

6. The electronic device of claim 5, wherein the touch input detection component comprises a touch screen display.

7. The electronic device of claim 1, wherein the second processor is inactive while the second processor is in a power off state.

8. The electronic device of claim 7, wherein the touch input detection component comprises a touch screen display.

9. The electronic device of claim 1, wherein the second processor is further configured to maintain an interface between the electronic device and a user of the electronic device while the second processor is active.

10. The electronic device of claim 1, wherein the first processor, when active, is further configured to perform one or more operations of the electronic device.

11. The electronic device of claim 1, wherein the second processor, when active, is further configured to receive one or more touch input signals.

12. An electronic device comprising:
a touch input detection component;
a first processor; and
a second processor electrically coupled with the first processor,
wherein the first processor is configured to:
based on a signal for activating the first processor generated in response to a user input applied to the touch input detection component while the first processor is inactive, switch the first processor from being inactive to being active, the first processor consuming power at a lower rate of power consumption while being inactive than while being active, and
output a first signal to the second processor, the first signal being for activating the second processor,
wherein the second processor is configured to:
based on the first signal input to the second processor while the first processor is active, switch the second processor to be active, and
based on receiving a touch input signal while the first processor and the second processor are active, output a second signal to the first processor, and
wherein the first processor is further configured to, based on receiving the second signal from the second processor, perform an operation of the electronic device.

13. The electronic device of claim 12, wherein the touch input detection component comprises a touch screen display.

14. The electronic device of claim 12,
wherein the second processor is further configured to consume power at a lower rate of power consumption while being inactive than while being active.

15. The electronic device of claim 14, wherein the touch input detection component comprises a touch screen display.

16. The electronic device of claim 12, wherein the first processor is inactive while the first processor is in a sleep state, and the second processor is inactive while the second processor is in the sleep state.

17. The electronic device of claim 16, wherein the touch input detection component comprises a touch screen display.

18. The electronic device of claim 12, wherein the second processor is inactive while the second processor is in a power off state.

19. The electronic device of claim 18, wherein the touch input detection component comprises a touch screen display.

20. The electronic device of claim 12, wherein the second processor is further configured to maintain an interface between the electronic device and a user of the electronic device while the second processor is active.

21. The electronic device of claim 12, wherein the first processor, when active, is further configured to perform one or more operations of the electronic device.

22. The electronic device of claim 12, wherein the second processor, when active, is further configured to receive one or more touch input signals.

23. An electronic device comprising:
a touch input detection component;
a sensor disposed below the touch input detection component and configured to detect a pressure applied to the touch input detection component;
a first processor; and
a second processor electrically coupled with the first processor,
wherein the first processor is configured to:
based on a signal for activating the first processor generated by the sensor in response to detecting the pressure applied to the touch input detection component, while the first processor and the second processor are inactive, switch the first processor from being inactive to being active, the first processor consuming power at a lower rate of power consumption while being inactive than while being active, and
output a first signal to the second processor, the first signal being for activating the second processor,
wherein the second processor is configured to:
based on the first signal input to the second processor while the first processor is active, switch the second processor from being inactive to being active, and
based on receiving a touch input signal while the first processor and the second processor are active, output a second signal to the first processor, and
wherein the first processor is further configured to, based on receiving the second signal from the second processor, perform an operation of the electronic device.

24. The electronic device of claim 23, wherein the second processor is further configured to consume power at a lower rate of power consumption while being inactive than while being active.

25. The electronic device of claim 23, wherein the first processor is inactive while the first processor is in a sleep state, and the second processor is inactive while the second processor is in the sleep state.

26. The electronic device of claim 23, wherein the second processor is inactive while the second processor is in a power off state.

27. The electronic device of claim 23, wherein the touch input detection component comprises a touch screen display.

28. The electronic device of claim 27,
wherein the second processor is further configured to consume power at a lower rate of power consumption while being inactive than while being active.

29. The electronic device of claim 27, wherein the first processor is inactive while the first processor is in a sleep state, and the second processor is inactive while the second processor is in the sleep state.

30. The electronic device of claim 27, wherein the second processor is inactive while the second processor is in a power off state.

31. The electronic device of claim 23, wherein the second processor is further configured to maintain an interface between the electronic device and a user of the electronic device while the second processor is active.

32. The electronic device of claim 23, wherein the first processor, when active, is further configured to perform one or more operations of the electronic device.

33. The electronic device of claim 23, wherein the second processor, when active, is further configured to receive one or more touch input signals.

* * * * *